United States Patent

Saban et al.

[11] Patent Number: 6,018,207
[45] Date of Patent: Jan. 25, 2000

[54] PAIRED INTERLOCKS FOR FLEXIBLE INDEXING OF ROTATED STATOR CORES

[75] Inventors: Daniel M. Saban; Robert D. Sirois; James J. Holich, all of Fort Wayne, Ind.

[73] Assignee: General Electric Company, Schenectady, N.Y.

[21] Appl. No.: 09/188,961

[22] Filed: Nov. 10, 1998

Related U.S. Application Data

[60] Provisional application No. 60/092,338, Jul. 10, 1998.

[51] Int. Cl.$^7$ ..................................................... H02K 1/06
[52] U.S. Cl. .......................... 310/217; 310/254; 310/259; 29/738
[58] Field of Search .................................... 310/216, 217, 310/254, 259, 129, 195, 211; 29/598, 738

[56] References Cited

U.S. PATENT DOCUMENTS

| | | | |
|---|---|---|---|
| 3,110,831 | 11/1963 | Zimmerle | 310/217 |
| 3,203,077 | 8/1965 | Zimmerle | 29/598 |
| 3,590,208 | 6/1971 | Martini | 219/92 |
| 4,110,895 | 9/1978 | Mitsui | 29/564.2 |
| 4,160,182 | 7/1979 | Mitsui | 310/214 |
| 4,272,579 | 6/1981 | Mitsui | 428/133 |
| 4,524,507 | 6/1985 | Hara et al. | 29/564.2 |
| 4,619,028 | 10/1986 | Neuenschwander | 29/332 |
| 4,738,020 | 4/1988 | Neuencshwander | 29/598 |
| 4,754,178 | 6/1988 | Kavanaugh | 310/49 R |
| 4,885,496 | 12/1989 | Wheeler | 310/254 |
| 5,123,155 | 6/1992 | Neuenschwander | 29/596 |
| 5,142,178 | 8/1992 | Kloster et al. | 310/217 |
| 5,182,848 | 2/1993 | Wheeler | 29/596 |
| 5,223,761 | 6/1993 | Larsen | 310/259 |
| 5,338,996 | 8/1994 | Yamamoto | 310/217 |
| 5,349,740 | 9/1994 | Neuenschwander | 29/596 |
| 5,349,741 | 9/1994 | Neuenschwander | 29/598 |
| 5,359,763 | 11/1994 | Neuenschwander | 29/738 |
| 5,373,622 | 12/1994 | Neuenschwander | 29/596 |
| 5,377,115 | 12/1994 | Neuenschwander | 364/476.1 |
| 5,649,349 | 7/1997 | Greenway | 29/598 |
| 5,799,387 | 9/1998 | Neuenschwander et al. | 29/598 |

*Primary Examiner*—Nestor Ramirez
*Assistant Examiner*—Joseph Waks
*Attorney, Agent, or Firm*—Welsh & Katz, Ltd.; Carl B. Horton, Esq.; Wayne O. Traynham, Esq.

[57] ABSTRACT

A stator core for a motor includes a plurality of laminations in a stacked formation one on another defining a generally circular inner periphery for receipt of a motor rotor. Each lamination defines an axis therethrough that is collinear with an axis of each lamination in the stacked formation. Each lamination is rotated about its axis relative to adjacent laminations a predetermined index angle. The laminations have first and second surfaces and are configured such that the core defines at least one inner lamination having laminations adjacent to both the first and second sides and outer laminations having laminations adjacent to one of the first and second sides. Each lamination has a predetermined number of circumferentially equally spaced slots extending radially inwardly from an inner edge of the lamination. The slots define conductor receiving regions therein. Each inner lamination includes at least one interlocking pair including a projection formed in one of the first and second surfaces at a predetermined radial distance from the axis. The projection extends generally transverse from a plane of the lamination. Each interlocking pair further defines a shadow formed therein that is at the same predetermined radial distance from the axis as is the projection. The shadow is spaced from the projection by an angle, $\alpha$, wherein each projection of a lamination is configured to reside within a shadow of a respective adjacent lamination when the laminations are in their stacked formation.

5 Claims, 7 Drawing Sheets

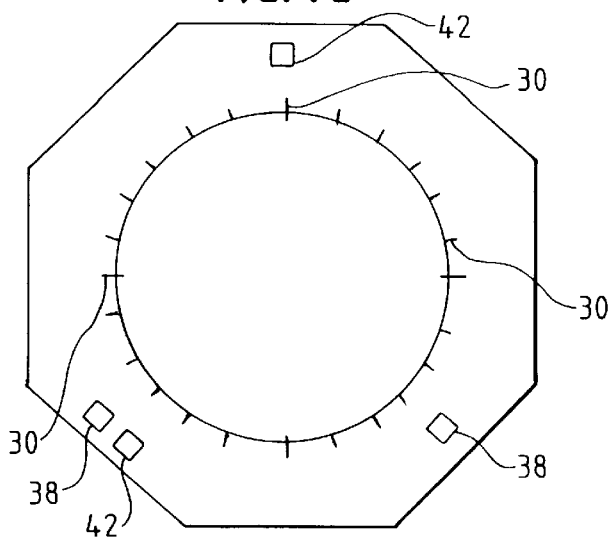
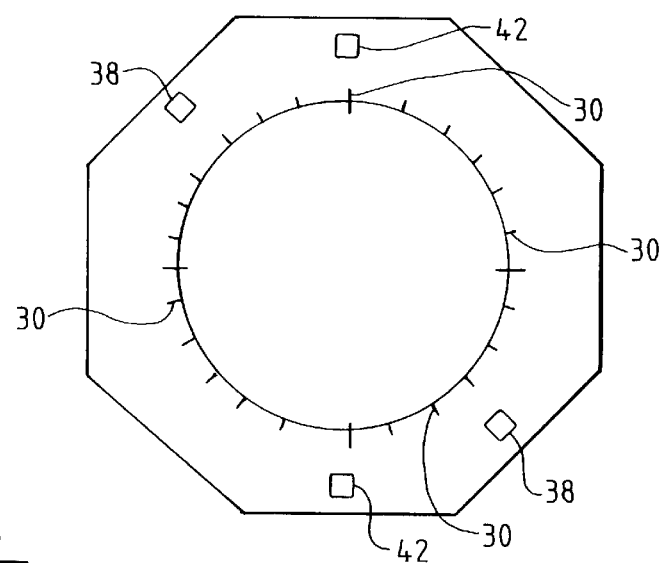
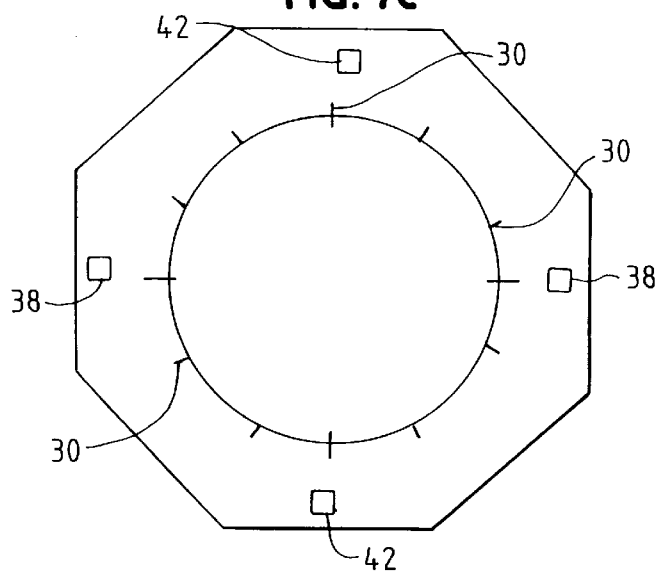

PAIRED INTERLOCKS FOR FLEXIBLE INDEXING OF ROTATED STATOR CORES

This application is a continuation of the Provisional Application 60/092,338 filed on Jul. 10, 1998.

FIELD OF THE INVENTION

The present invention relates generally to electric motors and more particularly to paired interlocks for motor stator cores that are formed from a stack of laminations.

BACKGROUND OF THE INVENTION

Electrical motors are in wide-spread use and can be found in every aspect of industrial, commercial and residential life. Motors can vary from small, fractional motors that are found, for example, in washing machines, refrigerators and air conditioners, to large industrial applications for driving manufacturing equipment, compressors, fans and the like. Motors are used to convert electrical energy into rotating energy or rotational force.

A typical motor includes a rotating central portion known as a rotor and a stationary outer portion referred to as a stator. Both the stator and rotor are housed in a housing that carries the motor. The rotor and stator contain electrical conducting elements through which the electrical energy is converted to rotational energy. Rotor and stator cores can be formed with varying numbers of slots which are the openings that receive the electrical conducting elements.

The stator core is that portion of the motor that contains stationary conductive elements. The number of slots in stator cores can vary considerably. In smaller, fractional squirrel-cage motors, for example, those having diameters of about two inches, the number of slots is generally between 8 and 52. The stator core structure is typically formed from a plurality of stacked plates or laminations. The laminations which are generally formed from metal, may be punched or pressed and subsequently stacked one on top of another to form the stator core. Due to the possible asymmetries in the lamination material, the laminations can be rotated so that the stator core, upon final assembly, forms a straight rather than lopsided stack The laminations are interlocked with one another to form a rigid stator core structure and to prevent the laminations from shifting relative to one another.

In one known interlocking arrangement, each lamination has a dimple or a recess punched into the surface which forms a corresponding projection on the opposite side of the lamination. The laminations are then stacked one on top of the other with the projections from one lamination engaging and residing within the recess in the next adjacent lamination. In this nested arrangement, the laminations are kept in alignment with one another by engagement of the projections and recesses. This is a common and accepted method for interlocking laminations.

Although such known methods are in common practice, they do have their drawbacks. First, there is a mathematical dependency between the number of slots in the stator and the number of interlocks. Specifically, the number of slots and the number of interlocks are chosen such that they are both divisible by 3, 4 or 5 to yield rotations of 120°, 90°, and 72.5°, respectively. Although this may be adequate when the stator has a number of slots that is readily divisible by such numbers, it is unacceptable when the number of slots in the stator varies from these readily divisible numbers. Additionally, when the stator core is formed having an outer shape other than round, that is when the core is formed with "flats" on the outer periphery of the core, the rotation angle must also of necessity be dependent upon the number of "flats" or the corresponding angle between "flats". For example, when the number of slots is 12, 15, 16, 20, 24, 28, 30, 32, 36, 40, 42, 45 or 48, the number of interlocks can be sufficient (e.g., between 3 and 4), and the rotational angles are readily determined by dividing the number of interlocks into 360°, so long as the number of flats is readily divisible into the number of slots.

For example, a stator having 12, 24 or 36 slots can include 2, 3, 4 or 6 interlocks which will have rotational angles of 180°, 120°, 90° and 60°, respectively. However, if the stator has 6 flats, this relationship no longer applies, because, for example, the 4 interlock configuration will require at least a 180° rotational angle. Likewise, with 2 interlocks, a 180° rotational angle is required. If the number of flats on the stator is 4, the number of interlocks is then limited to 2 and the rotational angle is again limited to 180°. It will thus be apparent that when the number of slots varies from these readily divisible numbers, and when the number of flats is not a like multiple of the number of interlocks, the incorporation of interlocks into a rotated stator core can become quite complex if not impossible.

It has also been observed that stator cores having laminations that have a number of slots that can only be rotated 180° can be susceptible to forming a lopsided stack or core. Additionally, such cores that include laminations that are rotated only 180° can produce undesirable ovality in the finished core if an offset exists, for example, in punched holes that are intended to be concentric with one another.

Accordingly, there continues to be a need for a stator core lamination interlocking arrangement that is independent of the number of slots and which is dependent only upon the number of flats. Such a configuration desirably accommodates lamination rotations.

SUMMARY OF THE INVENTION

A stator core for a motor includes a plurality of laminations in a stacked formation one on another defining a generally circular inner periphery for receipt of a motor rotor. Each lamination defines an axis therethrough that is collinear with an axis of each other lamination in the stacked formation. Each lamination is rotated about its axis relative to adjacent laminations a predetermined index angle. The laminations have first and second surfaces and are configured such that the core defines at least one inner lamination having laminations adjacent to both the first and second sides and outer laminations having laminations adjacent to one of the first and second sides.

Each lamination has a predetermined number of circumferentially equally spaced slots extending radially inwardly from an inner edge of the lamination. The slots each define a conductor receiving region therein. Each inner lamination includes at least one interlocking pair having a projection formed in one of the first and second surfaces at a predetermined radial distance from the axis. The projection extends generally transverse from a plane of the lamination. Each interlocking pair further defines a shadow formed therein that is at the same predetermined radial distance from the axis as is the projection. The shadow is spaced from the projection by an angle, α, wherein the at least one projection of a lamination is configured to reside within the at least one shadow of a respective adjacent lamination when the laminations are in their stacked formation.

DESCRIPTION OF THE FIGURES

FIGS. 7a–7c illustrate an exemplary eight-flat stator core laminations formed with 24 slots (FIGS. 7a and 7b) and 12 slots (FIG. 7c)

DETAILED DESCRIPTION OF THE INVENTION

Figure 1:
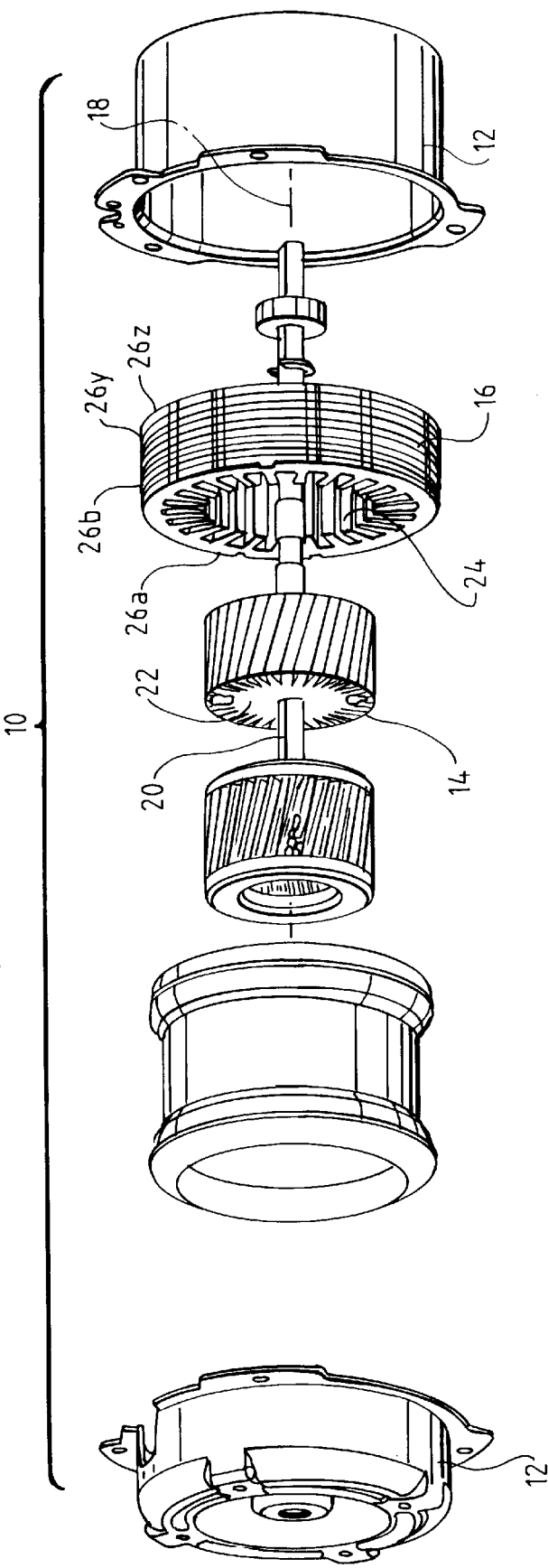
FIG. 1 is an exploded, perspective view of an exemplary motor, illustrating a stator having a core formed in accordance with the principles of the present invention.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Referring now to the figures and in particular to FIG. 1 there is shown a motor generally illustrated at 10. The motor 10 is enclosed within a housing 12 and includes a rotor 14 and a stator 16. The stator 16 is the stationary portion of the motor 10 that is mounted to and within the housing 12. The stator 16 defines a longitudinal axis, indicated at 18, therethrough. The rotor 14 is the rotating portion of the motor 10 that is positioned within the stator 16. The rotor 14 defines a longitudinal axis, indicated at 20, which is aligned with the stator such that the axes of the rotor and stator are collinear.

The rotor 14 is positioned within the stator 16 to define a gap, referred to as an air gap (not shown). The gap permits the rotor 14 to freely rotate within the stator 16 without the rotor and stator inadvertently contacting one another. In a typical, small, fractional motor, e.g., less than one horsepower, the gap can be about one ten thousandths of an inch (10 mils). Those skilled in the art will recognize that the gap between the rotor 14 and stator 16 must be maintained in order to prevent the rotor 14 and stator 16 from contacting one another as the rotor 14 rotates. Given that the rotor 14 can rotate at speeds exceeding 3600 revolutions per minute (RPM), such contact can damage both the rotor 14 and stator 16 thus rendering the motor 10 inoperable.

On the one hand, the gap must be sufficiently small so that the magnetic field that is created in the stator 16 can in turn induce an electric current in the rotor 14 which will give rise to an opposing magnetic field. It is the interaction of these two magnetic fields that is converted to mechanical energy and results in rotation of the rotor 14. On the other hand, the gap must be sufficiently large to preclude contact between the rotor 14 and stator 16. As the gap between the rotor 14 and stator 16 increases, this electromagnetic phenomena decreases. Thus, the size of the gap between the rotor 14 and stator 16 must be determined, balancing the need to maintain critical space between the components while maintaining the components sufficiently close to reduce and preferably minimize field losses.

The rotor 14 and stator 16 each include a core 22, 24, respectively that is formed from a plurality of plates or laminations 26 that are stacked together one on another. The laminations 26 are secured in place relative to one another by an interlocking system illustrated generally at 28. The interlocking system 28 prevents the laminations 26 from rotating, shifting and separating from each other, and thus maintains the core a unitary member during manufacture.

Figure 2:
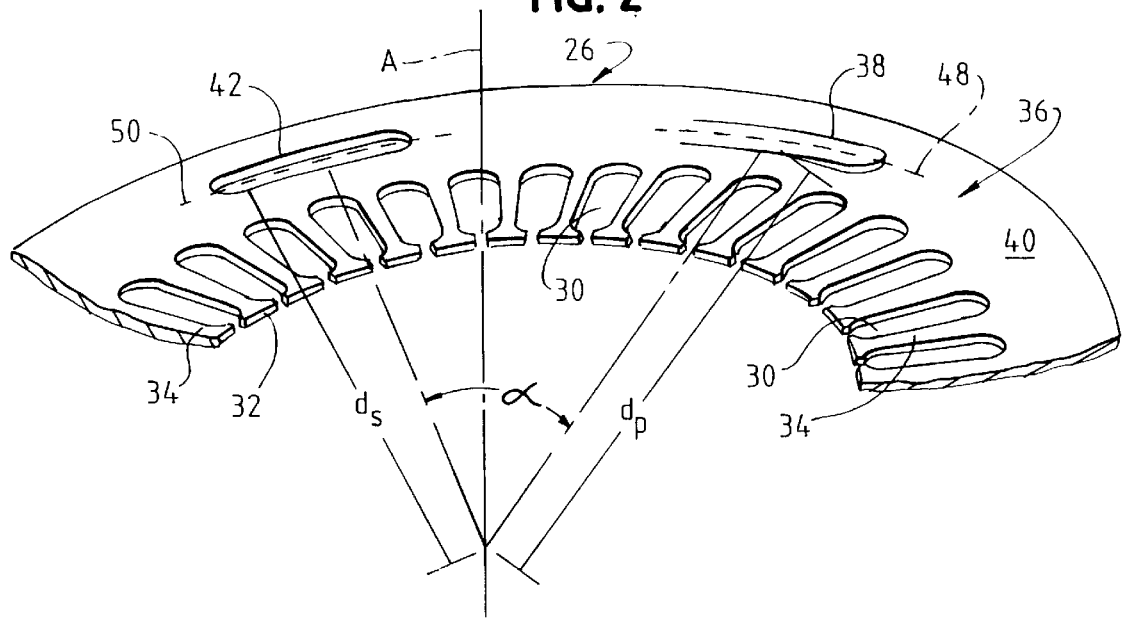
FIG. 2 is a perspective view of a portion of a stator lamination including one embodiment of a paired interlocking system.

As illustrated in FIG. 2 which shows a portion of a stator core 24, the core 24 includes a predetermined number of slots 30 formed therein at an inner edge 32 of each lamination 26. The slots 30 are defined by teeth 34 that separate the slots 30 from one another. In a typical stator core lamination 26, the teeth 34 are formed integral with the lamination outer or ring portion 36. The spaces between the teeth, that is the slots 30, are configured to receive and secure conducting elements (not shown) therein. In an exemplary, fractional motor, the conductors are each formed as a single mass from, for example, aluminum that has been injected into the slots in molten form. This type of motor manufacture is commonly referred to as a squirrel-cage motor.

The circular shape of the stator 16 is necessary only at an inner periphery thereof, at the innermost edges 38 of the teeth 34. To this end, stators 16 can be formed having a variety of outer peripheral shapes including square (FIGS. 5a–5c), hexagonal (FIGS. 6a–6c), and octagonal (FIGS. 7a–7c) overall configurations. The sides of the outer portion of the stator 16 are commonly referred to as flats F.

The laminations 26 are typically formed from sheet material, such as sheet steel that has been stamped in the form of the laminations. The individual laminations 26 are then stack, one on top of another, to form the core 24. As with much commercially available sheet material, the characteristics of the material such as the thickness may not be uniform throughout the sheet. As such, the thickness of the material may vary at points both across the width and along the length of the sheet from which the laminations are punched. Although such variances may not be critical for many applications, they can be quite critical for the manufacture of stator cores 24 because the stacked core 24 can exhibit asymmetries, e.g., lopsidedness, due to the varying lamination 26 thicknesses.

As set forth above, the core 24 must be straight, that is, it must have a right-cylindrical shape, so that the rotor 14 rotates within the stator 16 in a coaxial manner without contacting the sides of the stator 16 and so that the average distance between the rotor 14 and stator 16, e.g., the size of the air gap, is maintained as constant as is reasonably achievable. It has been observed that an effective way to account for or accommodate the variation in lamination thicknesses is to rotate the laminations 26 a predetermined number of degrees as they are formed to distribute the asymmetries about the entire 360° of the core 24. This is referred to as "rotating" the core 24. The angle that the laminations 26 are rotated relative to one another is referred to as the index angle. This rotational angle also accommodates asymmetries formed by the lamination manufacturing dies.

In known core configurations, the index angle is dependent upon the number of interlocks and the number of slots in the core as well as the number of flats in the core.

Figure 3:
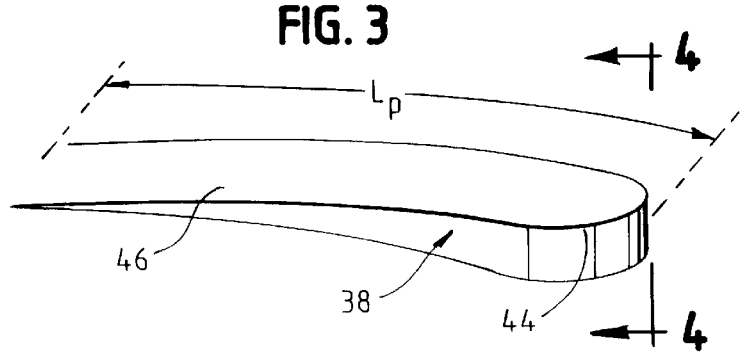
FIG. 3 is an enlarged view of a projection of the present paired interlocking system.
Figure 4:
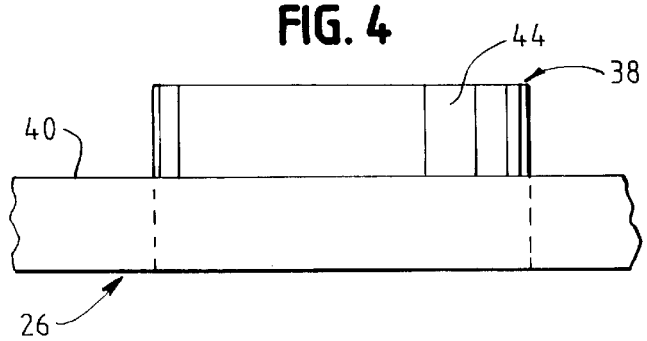
FIG. 4 is a cross-sectional view of the projection taken along line 44 of FIG. 3.

The present invention uses an interlocking system 28 that includes a raised projection or tab 38 that is formed in a surface 40 of the lamination 26 and a corresponding receiving opening or shadow 42 formed in the lamination 26 that is configured to receive a projection 38 from an adjacent lamination 26. In a preferred embodiment, the projection 38 has a lead portion 44 and a trailing portion 46. The lead portion 44 can be stepped, as shown in FIG. 3. Essentially, the lead portion 44 is the uppermost raised portion from the surface 40 of the lamination 26 and the trailing portion 46 can taper or ramp downwardly from the lead portion 44, sloping to the surface 40 of the lamination 26.

As best seen in FIG. 3, preferably the projection 38 defines an arcuate shape along its circumferential length as indicated by $L_p$ such that the center line as indicated at 48 remains at a fixed radial distance $d_p$ from the axis A of the lamination 26. In the present interlocking system 28, the index angle, that is the angle of rotation of each lamination 26 relative to adjacent laminations 26, and the number of interlock pairs, that is, the number of pairs of projections 38 and shadows 40, must be a common multiple, preferably greater than 2, of the greatest common multiple of the number of stator flats and stator slots 30. In this arrangement, the angle as indicated at a between each projection 38 and shadow 42 is not constrained. However, in a preferred arrangement, the angle α between each projection 38 and shadow 42 is constant for all pairs. Different interlocking arrangements can be compounded and combined into a single lamination 26 as well.

Unlike known interlocking arrangements which use a series of projections that lock or nest into one another in a fixed relation and at fixed positions, the projections 38 of the present invention are received in the shadows 42 that are angularly offset from the projections 38 and are elongated to receive the projections 38 along their respective length. This arrangement permits a projection 38 to reside fully within a shadow 42. Similar to the projection 38, each shadow 42 is preferably arcuate such that at a center line, indicated at 50, the shadow is at a fixed radial distance $d_p$ from the lamination axis A equal to the distance that the projection 38 is at relative to the axis A.

Figure 5A:
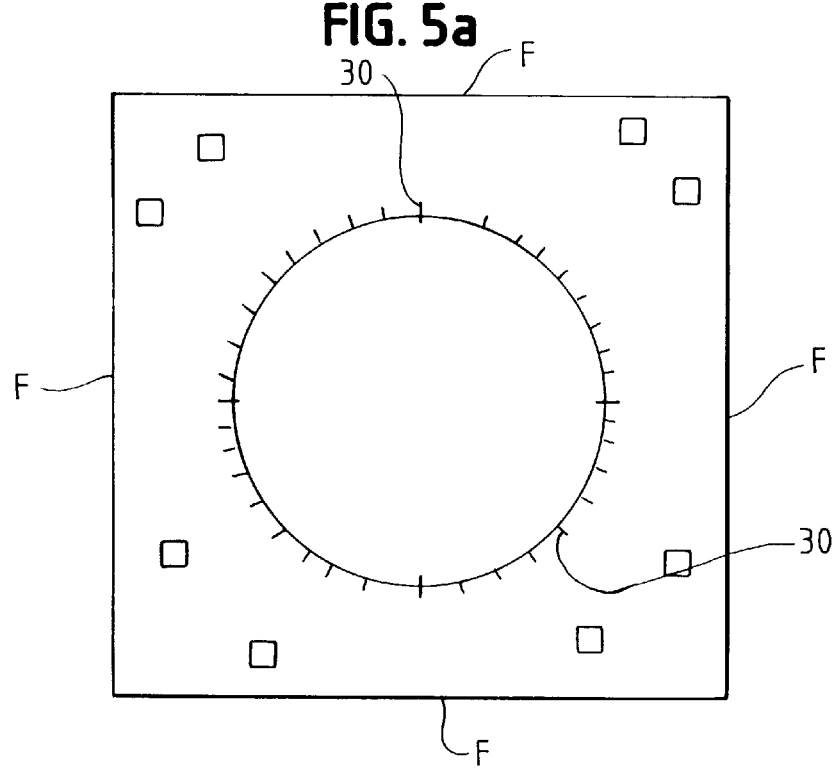
FIGS. 5a–5c illustrate various exemplary four-flat stator core laminations formed with 36 slots and with various interlock pair arrangements.
Figure 5B:
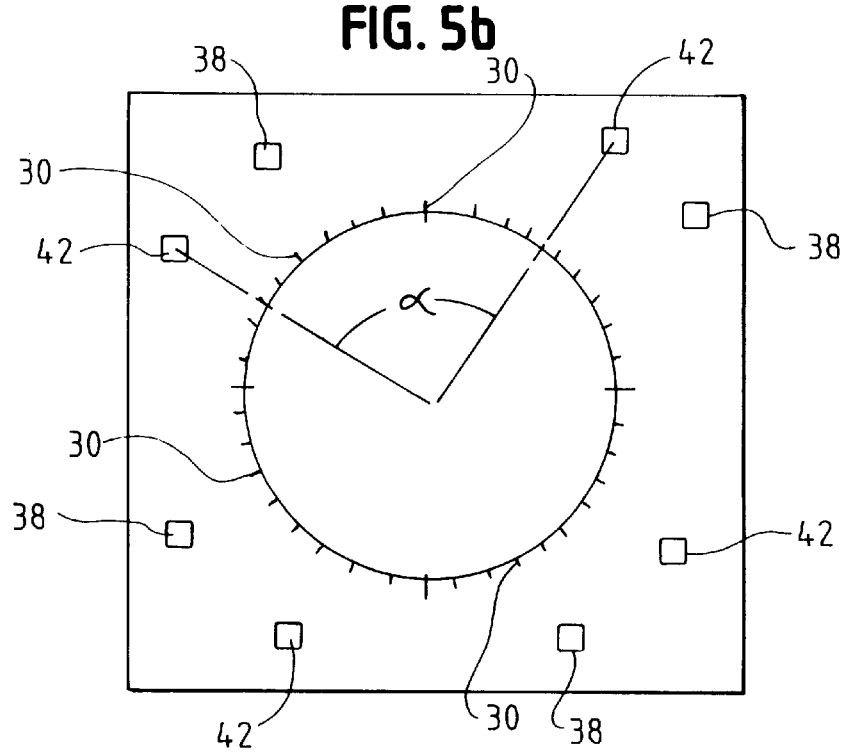
Figure 5C:
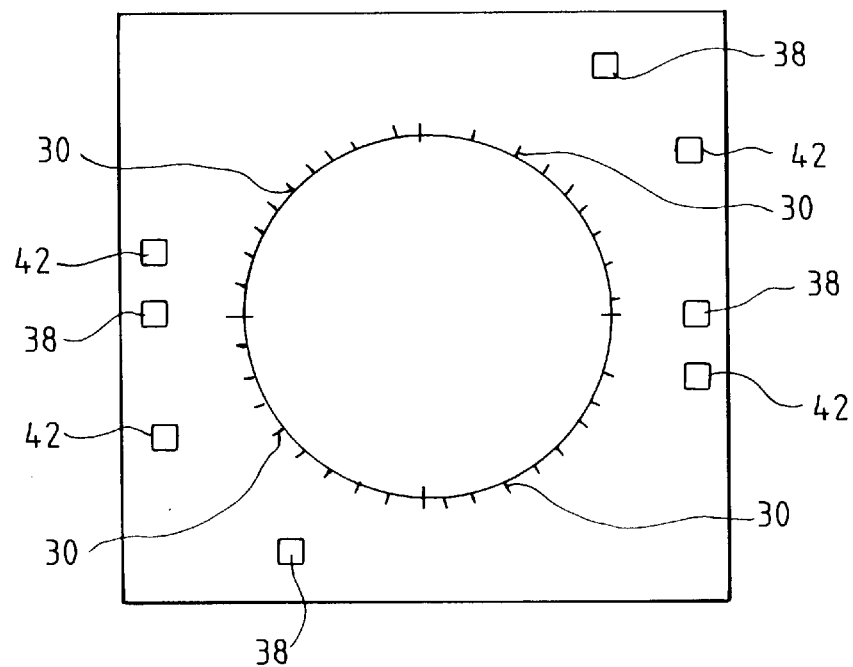

Referring now to FIG. 5a, there is shown a 36-slot stator with a generally square periphery, that is, the stator core includes 4 flats. The possible index angles for this stator are multiples of 90 mechanical degrees (i.e., 90°, 180°, 270°, 360° . . . 90°n (where n=any whole number)). In this arrangement, a projection 38 and its shadow 42 need only be rotationally symmetric and not at any given angle. The number of interlock pairs 36, 42 must also be a common multiple, preferably greater than 2, of the greatest common multiple of the number of stator flats F (4) and stator slots 30 (36) or 4. Nevertheless, as set forth above, the relationship between a projection 38 and its shadow 42 need only be rotationally symmetric. Where, for example, 8 conventional interlocks are used, 4 of the conventional "dimples" can be replaced with shadows to yield 4 pairs, with an angle within a pair being 90° and overlapping the adjacent pairs. This provides increased flexibility in using a most desired index angle.

Those skilled in the art will recognize that the flats F are a physical feature or attribute of the laminations 26 that must be accommodated in designing and assembling the core 24. Such physical features or attributes can take other forms, such as bolt holes, ventilation openings and the like. It will be apparent that accommodating such other, e.g., bolt holes, physical features or attributes can be effected by like considerations. For example, in a lamination that includes 4 bolt holes (in lieu of or in addition to flats), the number of interlock pairs 36, 42 must also be a common multiple, preferably greater than 2, of the greatest common multiple of the number of bolt holes (4) and stator slots 30 (36) or 4.

Figure 6A:
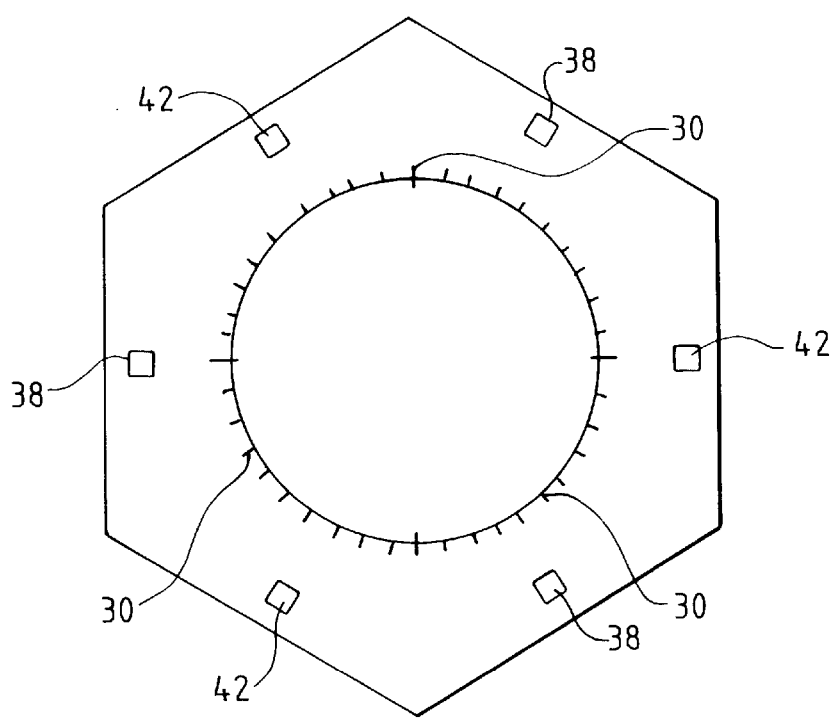
FIGS. 6a–6c illustrate exemplary six-flat stator core laminations formed with 40, 36 and 24 slots, respectively.
Figure 6B:
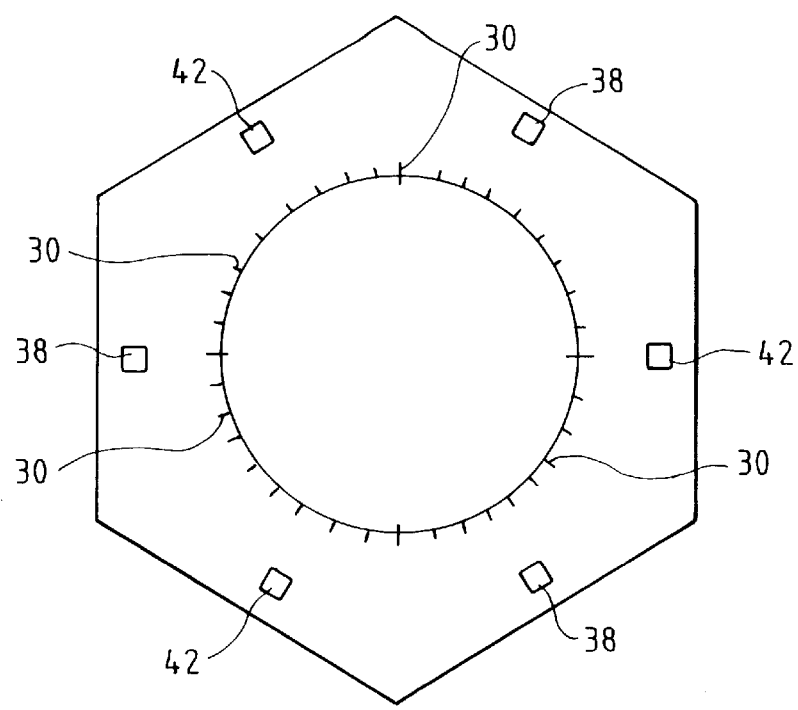
Figure 6C:
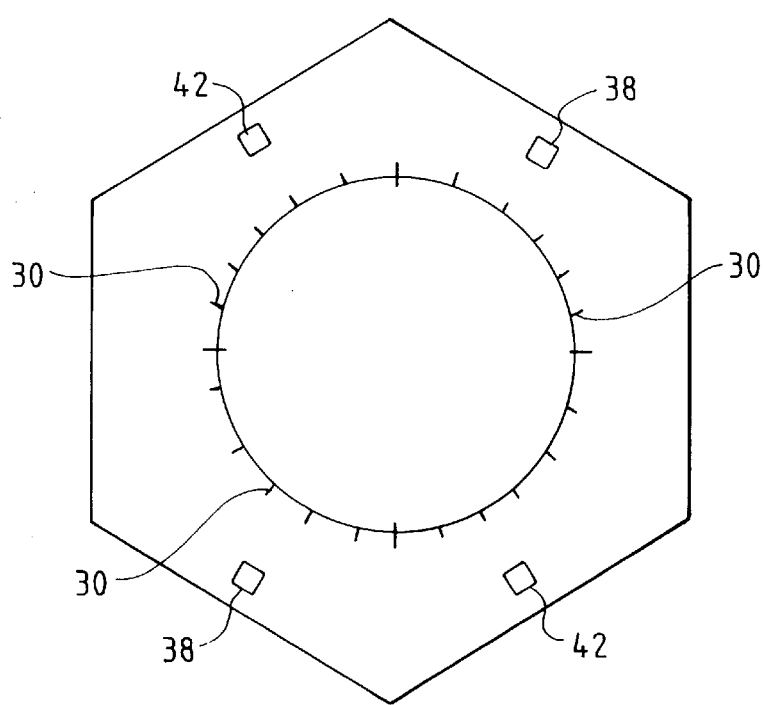
Figure 8A:
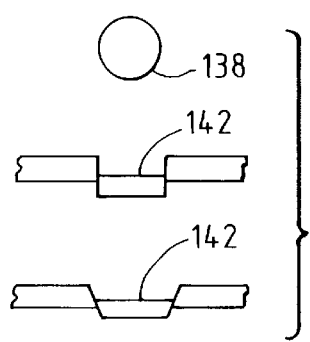
FIGS. 8a–8e illustrate various projection and shadow shapes for the present paired interlock system.
Figure 8B:
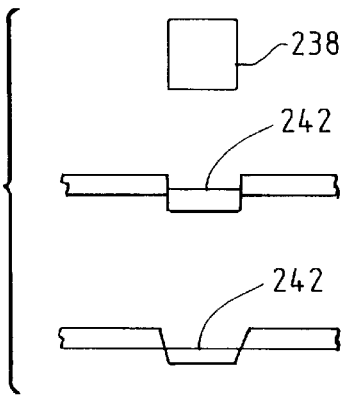
Figure 8C:
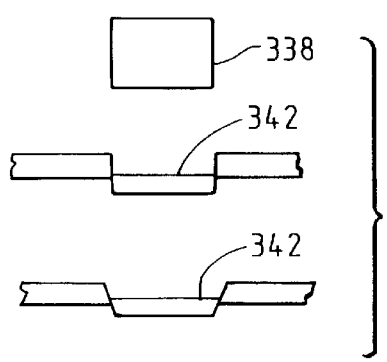
Figure 8D:
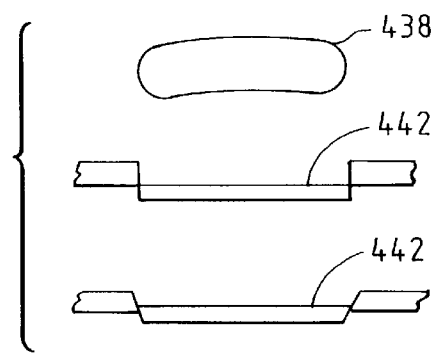
Figure 8E:
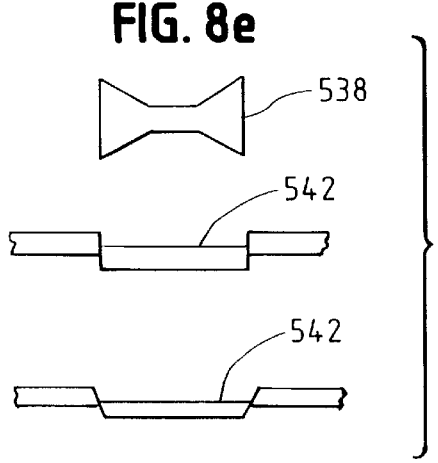

Referring now to FIG. 6a, there is shown a generally hexagonal stator lamination also having 36 stator slots 30. Here, the index angle can be any multiple of 60° with 6 interlock pairs 38, 42. This again provides extreme flexibility in that the index angle can be set at any multiple of 60° (i.e., 60°, 120°, 180°, 240°, 300° . . . 60° n (where n=any whole number)). FIG. 6b, illustrates a somewhat different slot and interlock configuration for a hexagonal stator lamination. In this illustration, the stator includes 40 slots 30. Here, the greatest common multiple between 40 (the number of slots 30) and 6 (the number of flats F), is 2. As such, the index angle is 180° or any multiple thereof. In a preferred embodiment, 3 interlock pairs are used to enhance the engagement between the laminations, to prevent shifting therebetween. FIG. 6c illustrates another hexagonal stator lamination including 24 slots. Here, the greatest common multiple between 24 (the number of slots 30) and 6 (the number of flats F), is 6. The index angle in this configuration can be set at any multiple of 60° using 6 interlock pairs 38, 40. It will be apparent that using 2 interlock pairs 38, 40, the index angle can be set at 180° and using 3 interlock pairs 38, 40 the index angle can be set at 120° or multiples thereof, however, as will be recognized by those skilled in the art, it is desirable to have the multiple, and thus the number of interlock pairs, be greater than 2.

Referring now to FIGS. 7a-7c, there are shown configurations in which the stator is formed having an octagonal shape or 8 flats F. It will be recognized by those skilled in the art that the flats F need not be straight segments but can be arcs as is often the case with octagonal laminations. In the octagonal lamination having 24 slots 30 (FIG. 7a), the greatest common multiple between 24 (the number of slots 30) and 8 (the number of flats F), is 8. To this end, an index angle of 45° (or any multiple thereof) can be effected using 8 pairs of interlocks 38, 42. Likewise, an index angle of 90° (or any multiple thereof) can be effected using 4 pairs of interlocks 38, 42. FIG. 7b illustrates another octagonal lamination having 12 slots 30. In this configuration, the greatest common multiple between 12 (the number of slots 30) and 8 (the number of flats F) is 4. As such, an index angle of 90° (or any multiple thereof) can be effected using 4 interlock pairs 38, 42.

It will be recognized by those skilled in the art that the present paired interlock arrangement 28 provides extreme flexibility in selecting a most desired index angle for a given stator core configuration.

It will also be recognized by those skilled in the art that shapes other than the elongated projection 38 can be utilized in the present paired interlocking system 28. Referring to FIGS. 8a-8e, examples of such other shapes include round projections 138, square projections 238, rectangular projections 338, elongated projections 438, double-ended opposingly oriented triangle or bow-tie projections 538. Each of these embodiments of the projection 38-538 can be formed with a ramped-trailing portion or the projection can be formed as a fully downwardly (or upwardly) extending tab. Likewise, the corresponding shadows 42-542 are formed having a tolerance to permit a tight fit.

Referring now to FIG. 1 it will be apparent that the end laminations 26a-26z must be formed so that they engage or are engaged by only one adjacent lamination 26. That is, although the interior laminations 26b-26y engage two adjacent laminations, the end laminations 26a-26z engage or are engaged by only their respective interior laminations. That is, one end lamination, for example 26a, is required only to receive the projections 88 from its adjacent lamination 26b, and the other end lamination, for example 26z, is required only to have its projections 38 received by its adjacent interior lamination 26y. This is readily accomplished by forming only receiving regions in end lamination 26a. Conversely, the opposing end lamination 26z can be formed as is any other lamination formed.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

We claim:

1. A stator core for a motor comprising:

a plurality of laminations in a stacked formation one on another defining a generally circular inner periphery, each of said laminations defining an axis therethrough that is collinear with an axis of each other of said laminations in said stacked formation, each of said laminations being rotated about its axis relative to adjacent ones of said laminations a predetermined index angle, each of said laminations having first and second surfaces and configured such that a core defines at least one of said laminations being an inner lamination and a pair of said laminations being outer laminations, each of said laminations having a predetermined number of circumferentially equally spaced slots extending radially inwardly from an inner edge of said lamination, each said slot defining a conductor receiving region therein, each said inner lamination including at least one interlocking pair including a projection formed in one of said first and second surfaces at a predetermined radial distance from said axis, said at least one projection extending generally transverse from a plane of said lamination, each said interlocking pair further defining at least one shadow formed therein, said at least one shadow being at said predetermined radial distance from said axis and being spaced from said at least one interlocking projection by an angle $\alpha$, wherein the at least one projection of a lamination is configured to reside within said at least one shadow of a respective one of said adjacent laminations when said laminations are in said stacked formation, each said lamination having a predetermined number of flats defining an outer periphery of said core and wherein said laminations are stacked one on another having said flats aligned with one another, and wherein said index angle of rotation of each of said laminations relative to said respective one of said adjacent laminations is a whole number multiple of $360°/n$, where said n is a greatest common multiple of the number of flats and said predetermined number of circumferentially equally spaced slots, and wherein each of said inner laminations includes at least n interlocking pairs and wherein successive laminations are disposed on a previous lamination with the projection of said previous lamination positioned in the shadow of said successive lamination so that each successive lamination is rotated relative to its previous lamination by the angle $\alpha$ to interlock each said previous and successive laminations with one another, and wherein said circumferentially spaced slots align with one another to form said stacked formation.

2. The stator core in accordance with claim 1 wherein each said inner lamination includes at least two of said interlocking pairs.

3. The stator core in accordance with claim 1 wherein said core has a round outer periphery.

4. The stator core in accordance with claim 1 wherein said flats define an other than round geometric shape.

5. The stator core in accordance with claim 1 wherein each said projection has an elongated, circumferentially extending shape, and wherein each said shadow has a shape corresponding to the shape of said projections.

* * * * *